United States Patent [19]

Chester et al.

[11] Patent Number: 4,526,942

[45] Date of Patent: Jul. 2, 1985

[54] CATALYST FOR OLEFIN POLYMERIZATION

[75] Inventors: Arthur W. Chester, Cherry Hill; James G. Murray, East Brunswick, both of N.J.

[73] Assignee: Mobil Oil Corporation, New York, N.Y.

[21] Appl. No.: 456,927

[22] Filed: Jan. 10, 1983

Related U.S. Application Data

[62] Division of Ser. No. 305,233, Sep. 24, 1981, Pat. No. 4,377,497.

[51] Int. Cl.$^3$ .............................................. C08F 4/06
[52] U.S. Cl. ................................. 526/130; 526/352; 502/154
[58] Field of Search ......................................... 526/130

[56] References Cited

U.S. PATENT DOCUMENTS

| | | | |
|---|---|---|---|
| 3,325,465 | 6/1967 | Jones et al. | 526/130 X |
| 3,709,853 | 1/1973 | Karapinka | 526/96 X |
| 3,757,002 | 9/1973 | Karol | 526/130 |
| 4,015,059 | 3/1977 | Karol | 526/130 |
| 4,203,869 | 5/1980 | Rollmann | 502/69 |
| 4,376,722 | 3/1983 | Chester et al. | 526/130 X |
| 4,446,243 | 5/1984 | Chester et al. | 526/130 X |

Primary Examiner—Paul R. Michl
Assistant Examiner—S. Babajko
Attorney, Agent, or Firm—A. J. McKillop; M. G. Gilman; E. F. Kenehan, Jr.

[57] ABSTRACT

Zeolite supported, organochromium based catalyst compositions are provided which are especially suitable for the polymerization of 1-olefins such as ethylene. Pi-bonded organochromium [II] compounds such as chromocene (dicyclopentadienyl chromium) are reacted with ZSM-5 type zeolites to produce such novel catalysts.

14 Claims, No Drawings

CATALYST FOR OLEFIN POLYMERIZATION

This is a division of copending application Ser. No. 305,233, filed Sept. 24, 1981, now U.S. Pat. No. 4,377,497.

BACKGROUND OF THE INVENTION

1. Field of the Invention

The present invention relates to zeolite-based organochromium catalyst compositions especially suitable for the polymerization of 1-olefins such as ethylene.

2. Description of the Prior Art

Organochromium materials such as pi-bonded organochromium [II] compounds are known to be especially effective catalysts for the polymerization of olefins such as ethylene. Such materials by themselves, however, are incapable of initiating the polymerization reaction, and, for this reason, such organochromium compounds are generally adsorbed or deposited on an inorganic oxide catalyst support having a high surface area. Karapinka et al; U.S. Pat. No. 3,709,853, issued Jan. 9, 1973, for example, discloses bis-(cyclopentadienyl) chromium [II] compounds supported on a variety of porous, amorphous silica materials to thereby form effective ethylene polymerization catalysts.

Notwithstanding the existence of such known polymerization catalysts comprising supported organochromium materials, there is a continuing need to identify catalysts and catalyst support materials which can be effectively employed in the commercially important field of olefin polymerization. Accordingly, it is an object of the present invention to provide novel organochromium based catalyst compositions which are especially suitable for promoting polymerization of 1-olefins such as ethylene. It is a further object of the present invention to provide an olefin polymerization process employing such novel chromium-based catalyst compositions.

These and other objectives can be realized by means of the composition and process embodiments of the invention described herein.

SUMMARY OF THE INVENTION

The present invention provides a catalyst composition comprising the reaction product of a pi-bonded organoc hromium [II] compound such as chromocene and a particular type of crystalline aluminosilicate zeolite. The zeolite material employed has a silica to alumina molar ratio of at least about 12 and a Constraint Index within the approximate range of about 1 to 12.

The present invention also provides a process for polymerizing 1-olefins by contacting a 1-olefin monomer with a catalytically effective amount of such a novel organochromium based zeolite catalyst, under temperature and pressure conditions which are suitable for promoting a polymerization reaction.

DETAILED DESCRIPTION OF THE INVENTION

As noted; the catalyst compositions employed for olefin polymerization in accordance with the present invention comprise the reaction product of a crystalline aluminosilicate zeolite and a particular type of organochromium compound.

The crystalline zeolite component of the catalyst composition of the present invention is a member of a particular class of zeolitic materials which exhibit unusual properties. Although these zeolites have unusually low alumina contents, i.e. high silica to alumina mole ratios, they are very active even when the silica to alumina mole ratio exceeds 30. The activity is surprising, since catalytic activity is generally attributed to framework aluminum atoms and/or cations associated with these aluminum atoms. These zeolites retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity. These zeolites, used as catalysts, generally have low coke-forming activity and therefore are conducive to long times on stream between regenerations by burning carbonaceous deposits with oxygen-containing gas such as air.

An important characteristic of the crystal structure of this particular class of zeolites is that it provides a selective constrained access to and egress from the intracrystalline free space by virtue of having an effective pore size intermediate between the small pore Linde A and the large pore Linde X, i.e. the pore windows of the structure are of about a size such as would be provided by 10-membered rings of silicon atoms interconnected by oxygen atoms. It is to be understood, of course, that these rings are those formed by the regular disposition of the tetrahedra making up the anionic framework of the crystalline zeolite, the oxygen atoms themselves being bonded to the silicon (or aluminum, etc.) atoms at the centers of the tetrahedra.

The silica to alumina mole ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with a silica to alumina mole ratio of at least 12 are useful, it is preferred in some instances to us zeolites having substantially higher silica/alumina ratios, e.g. 1600 and above. In addition, zeolites as otherwise characterized herein but which are substantially free of aluminum, that is zeolites having silica to alumina mole ratios of up to infinity, are found to be useful and even preferable in some instances. Such "high silica" or "highly siliceous" zeolites are intended to be included within this description. Also to be included within this definition are substantially pure silica analogs of the useful zeolites described herein, that is to say those zeolites having no measurable amount of aluminum (silica to alumina mole ratio of infinity) but which otherwise embody the characteristics disclosed.

Members of this particular class of zeolites, after activation, acquire an intracrystalline sorption capacity for normal hexane which is greater than that for water, i.e. they exhibit "hydrophobic" properties. This hydrophobic character can be used to advantage in some applications.

Zeolites of the particular class useful herein have an effective pore size such as to freely sorb normal hexane. In addition, their structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although in some instances excessive puckering of the rings or pore blockage may render these zeolites ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons and, therefore, it is not the present intention to entirely judge the usefulness of a particular zeolite solely from theoretical structural considerations.

Rather than attempt to judge from crystal structure whether or not a zeolite possesses the necessary constrained access to molecules of larger cross-section than normal paraffins, a simple determination of the "Constraint Index" as herein defined may be made by passing continuously a mixture of an equal weight of normal hexane and 3-methylpentane over a sample of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 540° C. for at least 15 minutes. The zeolite is then flushed with helium and the temperature is adjusted between 290° C. and 510° C. to give an overall conversion of between 10 percent and 60 percent. The mixture of hydrocarbons is passed at 1 liquid hourly space velocity (i.e., 1 volume of liquid hydrocarbon per volume of zeolite per hour) over the zeolite with a helium dilution to give a helium to (total) hydrocarbon mole ratio of 4:1. After 20 minutes on stream, a sample of the effluent is taken and analyzed, most conveniently by gas chromatography, to determine the fraction remaining unchanged for each of the two hydrocarbons.

While the above experimental procedure will enable one to achieve the desired overall conversion of 10 to 60 percent for most zeolite samples and represents preferred conditions, it may occasionally be necessary to use somewhat more severe conditions for samples of very low activity, such as those having an exceptionally high silica to alumina mole ratio. In those instances, a temperature of up to about 540° C. and a liquid hourly space velocity of less than one, such as 0.1 or less, can be employed in order to achieve a minimum total conversion of about 10 percent.

The "Constraint Index" is calculated as follows:

$$\text{Constraint Index} = \frac{\log_{10}(\text{fraction of hexane remaining})}{\log_{10}(\text{fraction of 3-methylpentane remaining})}$$

The Constraint Index approximates the ratio of the cracking rate constants for the two hydrocarbons. Zeolites suitable for the present invention are those having a Constraint Index of about 1 to 12. Constraint Index (CI) values for some typical materials are:

|  | C.I. |
| --- | --- |
| ZSM-4 | 0.5 |
| ZSM-5 | 8.3 |
| ZSM-11 | 8.7 |
| ZSM-12 | 2 |
| ZSM-23 | 9.1 |
| ZSM-35 | 4.5 |
| ZSM-38 | 2 |

-continued

|  | C.I. |
| --- | --- |
| ZSM-48 | 3.4 |
| TMA Offretite | 3.7 |
| Clinoptilolite | 3.4 |
| Beta | 0.6 |
| H-Zeolon (mordenite) | 0.4 |
| REY | 0.4 |
| Amorphous Silica-Alumina | 0.6 |
| Erionite | 38 |

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby exhibit different Constraint Indices. Constraint Index seems to vary somewhat with severity of operation (conversion) and the presence or absence of binders. Likewise, other variables such as crystal size of the zeolite, the presence of occluded contaminants, etc., may affect the constraint index. Therefore, it will be appreciated that it may be possible to so select test conditions as to establish more than one value in the range of 1 to 12 for the Constraint Index of a particular zeolite. Such a zeolite exhibits the constrained access as herein defined and is to be regarded as having a Constraint Index in the range of 1 to 12. Also contemplated herein as having a Constraint Index in the range of 1 to 12 and therefore within the scope of the defined class of highly siliceous zeolites are those zeolites which, when tested under two or more sets of conditions within the above-specified ranges of temperature and conversion, produce a value of the Constraint Index slightly less than 1, e.g. 0.9, or somewhat greater than 12, e.g. 14 or 15, with at least one other value within the range of 1 to 12. Thus, it should be understood that the Constraint Index value as used herein is an inclusive rather than a exclusive value. That is, a crystalline zeolite when identified by any combination of conditions within the testing definition set forth herein as having a Constraint Index in the range of 1 to 12 is intended to be included in the instant novel zeolite definition whether or not the same identical zeolite, when tested under other of the defined conditions, may give a Constraint Index value outside of the range of 1 to 12.

The particular class of zeolites defined herein is exemplified by ZSM-5, ZSM-11, ZSM-12, ZSM-23, ZSM-35, ZSM-38, ZSM-48 and other similar materials.

ZSM-5 is described in greater detail in U.S. Pat. No. 3,702,886 and Re 29,948. The entire description contained within those patents, particularly the X-ray diffraction pattern of therein disclosed ZSM-5, are incorporated herein by reference.

ZSM-11 is described in U.S. Pat. No. 3,709,979. That description, and in particular the X-ray diffraction pattern of said ZSM-11, is incorporated herein by reference.

ZSM-12 is described in U.S. Pat. No. 3,832,449. That description, and in particular the X-ray diffraction patten disclosed therein, is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly described in U.S. Pat. No. 4,046,859. The description of that zeolite, and particularly the specified X-ray diffraction pattern thereof, is incorporated herein by reference.

ZSM-48 can be identified, in terms of moles of anhydrous oxides per 100 moles of silica, as follows:

(0–15)RN: (0–1.5)M$_{2/n}$O: (0–2)Al$_2$O$_3$: (100)SiO$_2$ wherein:

M is at least one cation having a valence n; and

RN is a C$_1$–C$_{20}$ organic compound having at least one amine functional group of pK$_a \geq 7$.

It is recognized that, particularly when the composition contains tetrahedral, framework aluminum, a fraction of the amine functional groups may be protonated. The doubly protonated form, in conventional notation, would be (RNH)$_2$O and is equivalent in stoichiometry to 2RN+H$_2$O.

The characteristic X-ray diffraction pattern of the synthetic zeolite ZSM-48 has the following significant lines:

| d(A) | Characteristic Lines of ZSM-48 Relative Intensity |
| --- | --- |
| 11.9 | W–S |
| 10.2 | W |
| 7.2 | W |
| 5.9 | W |
| 4.2 | VS |
| 3.9 | VS |
| 3.6 | W |
| 2.85 | W |

These values were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, 100 I/I$_o$, where I$_o$ is the intensity of the strongest line or peak, and d (obs.), the interplanar spacing in A, corresponding to the recorded lines, were calculated. In the foregoing table the relative intensities are given in terms of the symbols W=weak, VS=very strong and W-S=weak-to-strong. Ion exchange of the sodium with cations reveals substantially the same pattern with some minor shifts in interplanar spacing and variation in relative intensity. Other minor variations can occur depending on the silicon to aluminum ratio of the particular sample, as well as if it has been subjected to thermal treatment.

The ZSM-48 can be prepared from a reaction mixture containing a source of silica, water, RN, an alkali metal oxide (e.g. sodium) and optionally alumina. The reaction mixture should have a composition, in terms of mole ratios of oxides, falling within the following ranges:

| REACTANTS | BROAD | PREFERRED |
| --- | --- | --- |
| Al$_2$O$_3$/SiO$_2$ = | 0 to 0.02 | 0 to 0.01 |
| Na/SiO$_2$ = | 0 to 2 | 0.1 to 1.0 |
| RN/SiO$_2$ = | 0.01 to 2.0 | 0.05 to 1.0 |
| OH$^-$/SiO$_2$ = | 0 to 0.25 | 0 to 0.1 |
| H$_2$O/SiO$_2$ = | 10 to 100 | 20 to 70 |
| H$^+$(added)/SiO$_2$ = | 0 to 0.2 | 0 to 0.05 | wherein RN is a C$_1$–C$_{20}$ organic compound having an amine functional group of pK$_a \geq 7$. The mixture is maintained at 80°–250° C. until crystals of the material are formed. H$^+$(added) is moles acid added in excess of the moles of hydroxide added. In calculating H$^+$(added) and OH values, the term acid (H$^+$) includes both hydronium ion, whether free or coordinated, and aluminum. Thus aluminum sulfate, for example, would be considered a mixture of aluminum oxide, sulfuric acid, and water. An amine hydrochloride would be a mixture of amine and HCl. In preparing the highly siliceous form of ZSM-48 no alumina is added. Thus, the only aluminum present occurs as an impurity in the reactants.

Preferably, crystallization is carried out under pressure in an autoclave or static bomb reactor, at 80° C. to 250° C. Thereafter, the crystals are separated from the liquid and recovered. The composition can be prepared utilizing materials which supply the appropriate oxide. Such compositions include sodium silicate, silica hydrosol, silica gel, silicic acid, RN, sodium hydroxide, sodium chloride, aluminum sulfate, sodium aluminate, aluminum oxide, or aluminum itself. RN is a C$_1$–C$_{20}$ organic compound containing at least one amine functional group of pK$_a \geq 7$, as defined above, and includes such compounds as C$_3$–C$_{18}$ primary, secondary, and tertiary amines, cyclic amine (such as piperidine, pyrrolidine and piperazine), and polyamines such as NH$_2$–C$_n$H$_{2n}$–NH$_2$, wherein n is 4–12.

In all of the foregoing zeolites, the original cations can be subsequently replaced, at least in part, by calcination and/or ion exchange with another cation. Thus, the original cations can be exchanged into a hydrogen or hydrogen ion precursor form or a form in which the original cations have been replaced by a metal of, for example, Groups II through VIII of the Periodic Table. Thus, it is contemplated to exchange the original cations with ammonium ions or with hydronium ions. Catalytically active forms of these would include, in particular, hydrogen, rare earth metals, calcium, nickel, palladium and other metals of Groups II and VIII of the Periodic Table. It is the hydrogen form of such zeolites which are reacted with organometallic materials to form the polymerization catalysts of the present invention.

It is to be understood that by incorporating by reference the foregoing patents to describe examples of specific members of the specified zeolite class with greater particularity, it is intended that identification of the therein disclosed crystalline zeolites be resolved on the basis of their respective X-ray diffraction patterns. As discussed above, the present invention contemplates utilization of such catalysts wherein the mole ratio of silica to alumina is essentially unbounded. The incorporation of the identified patents should therefore not be construed as limiting the disclosed crystalline zeolites to those having the specific silica-alumina mole ratios discussed therein, it now being known that such zeolites may be substantially aluminum-free and yet, having the same crystal structure as the disclosed materials, may be useful or even preferred in some applications. It is the crystal structure, as identified by the X-ray diffraction "fingerprint", which establishes the identity of the specific crystalline zeolite material.

The specific zeolites described, when prepared in the presence of organic cations, are substantially catalytically inactive, possibly because the intro-crystalline free space is occupied by organic cations from the forming solution. They may be activated by heating in an inert atmosphere at 540° C. for one hour, for example, followed by base exchange with ammonium salts followed by calcination at 540° C. in air. The presence of organic cations in the forming solution may not be absolutely essential to the formation of this type zeolite; however, the presence of these cations does appear to favor the formation of this special class of zeolite. More generally, it is desirable to activate this type catalyst by base exchange with ammonium salts followed by calcination in air at about 540° C. for from about 15 minutes to about 24 hours.

Natural zeolites may sometimes be converted to zeolite structures of the class herein identified by various activation precedures and other treatments such as base exchange, steaming, alumina extraction and calcination, alone or in combinations. Natural minerals which may be so treated include ferrierite, brewsterite, stilbite, dachiardite, epistilbite, heulandite, and clinoptilolite.

The preferred crystalline zeolites for utilization herein include ZSM-5, ZSM-11, ZSM-12, ZSM-23, ZSM-35, ZSM-38 and ZSM-48, with ZSM-5 being particularly preferred.

Crystalline zeolites used in the present invention will generally have a crystal dimension of from about 0.01 to 100 microns, more preferably from about 0.02 to 10 microns.

In a preferred aspect of this invention, the zeolites hereof are selected as those providing among other things a crystal framework density, in the dry hydrogen form, of not less than about 1.6 grams per cubic centimeter. It has been found that zeolites which satisfy all three of the discussed criteria are most desired for several reasons. Therefore, the preferred zeolites useful with respect to this invention are those having a Constraint Index as defined above of about 1 to about 12, a silica to alumina mole ratio of at least about 12 and a dried crystal density of not less than about 1.6 grams per cubic centimeter. The dry density for known structures may be calculated from the number of silicon plus aluminum atoms per 1000 cubic Angstroms, as given, e.g., on Page 19 of the article ZEOLITE STRUCTURE by W. M. Meier. This paper, the entire contents of which are incorporated herein by reference, is included in PROCEEDINGS OF THE CONFERENCE ON MOLECULAR SIEVES, (London, April 1967) published by the Society of Chemical Industry, London, 1968.

When the crystal structure is unknown, the crystal framework density may be determined by classical pyknometer techniques. For example, it may be determined by immersing the dry hydrogen form of the zeolite in an organic solvent which is not sorbed by the crystal. Or, the crystal density may be determined by mercury porosimetry, since mercury will fill the interstices between crystals but will not penetrate the intracrystalline free space.

It is possible that the unusual sustained activity and stability of this special class of zeolites is associated with its high crystal anionic framework density of not less than about 1.6 grams per cubic centimeter. This high density must necessarily be associated with a relatively small amount of free space within the crystal, which might be expected to result in more stable structures. This free space, however, is important as the locus of catalytic activity.

Crystal framework densities of some typical zeolites, including some which are not within the purview of this invention are:

|  | Void Volume | Framework Density |
| --- | --- | --- |
| Ferrierite | 0.28 cc/cc | 1.76 g/cc |
| Mordenite | .28 | 1.7 |
| ZSM-5, −11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

When synthesized in the alkali metal form, the zeolite is conveniently converted to the hydrogen form, generally by intermediate formation of the ammonium form as a result of ammonium ion exchange and calcination of the ammonium form to yield the hydrogen form. In addition to the hydrogen form, other forms of the zeolite wherein the original alkali metal has been reduced to less than about 1.5 percent by weight may be used as precursors to the alkaline-earth metal modified zeolites of the present invention. Thus, the orginal alkali metal of the zeolite may be replaced by ion exchanger with other suitable metal cations of Groups I through VIII of the Periodic Table, including, by way of example, nickel, copper, zinc, palladium, calcium or rare earth metals. As indicated, it is generally the hydrogen form of the zeolite component which is reacted with organometallic compound in accordance with the present invention.

In practicing the olefin polymerization process of the present invention, it may be useful to incorporate the above-described crystalline zeolites with a matrix comprising another material resistant to the temperature and other conditions employed in the process. Such matrix material is useful as a binder and imparts greater resistance to the catalyst for the temperature, pressure and reactant feed stream velocity conditions encountered in, for example, polymerization processes.

Useful matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee-Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of zeolite component and inorganic oxide gel matrix, on an anhydrous basis, may vary widely with the zeolite content ranging from between about 1 to about 99 percent by weight and more usually in the range of about 5 to about 80 percent by weight of the dry composite.

To form the olefin polymerization catalysts of the present invention, the crystalline zeolite material as hereinbefore described is reacted with an organochromium [II] compound. Organochromium [II] compounds useful in forming the catalysts of the present invention include pi-bonded organochromium [II] materials such as fused ring bis(idenyl)- and bis-(fluorenyl)-chromium [II] compounds, and chromocene compounds.

The fused ring organochromium compounds which may be utilized in the present invention have the structure:

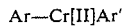
Ar—Cr[II]Ar' wherein Ar and Ar' are the same or different and are indenyl radicals of the structure:

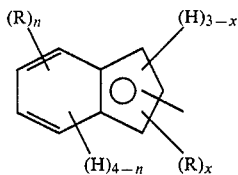

wherein the R's are the same or different $C_1$ to $C_{10}$, inclusive, hydrocarbon radicals, and n is an integer of 0 to 4, inclusive, and x is 0, 1, 2 or 3, or are fluorenyl radicals of the structure:

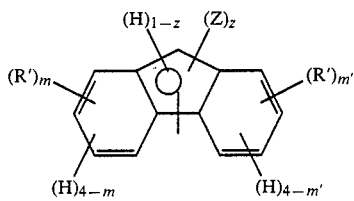

wherein the R's may be the same or different $C_1$ to $C_{10}$, inclusive, hydrocarbon radicals, and m and m' may be the same or different integers of 0 to 4, inclusive, and Z is H or R', and z is 0 or 1. The R and R' hydrocarbon radicals may be saturated or unsaturated, and they may include aliphatic, alicyclic and aromatic radicals such as methyl, ethyl, propyl, butyl, pentyl, cyclopentyl, cyclohexyl, allyl, phenyl and naphthyl radicals. Such fused ring organochromium compounds are described more fully in Karol; U.S. Pat. No. 4,015,059; Issued March 29, 1977, incorporated herein by reference.

A preferred type of organochromium type compound for use in the present invention are the bis-(cyclopentadienyl) chromium [II] or "chromocene" compounds which have the structure:

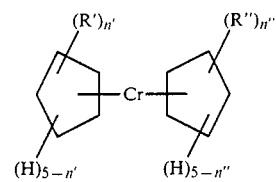

wherein each of R' and R" is a hydrocarbon radical having 1 to about 20 carbon atoms and each of n' and n" is an interger having a value of 0 to 5 inclusive. The R' and R" hydrocarbon radicals may be saturated or unsaturated and may include aliphatic radicals such as methyl, propyl, butyl, pentyl, allyl, and the like; alicyclic radicals such as cyclo-pentyl, cyclohexyl, cycloheptyl, and the like; and alicyclic radicals such as cyclopentyl, cyclohexyl, cycloheptyl, and the like; and aromatic radicals such as phenyl, naphthyl and like radicals.

A preferred material of this type is dicyclopentadienyl chromium which may be prepared by a variety of methods, such as by the reaction of sodium cyclopentadiene with chromous chloride which is described more fully in the Brantley; U.S. Pat. No. 2,870,183; issued Jan. 20, 1959, or by reacting an excess of sodium cyclopentadiene with chromic chloride.

A preferred procedure for preparing dicyclopentadienyl chromium[II] involves reacting cyclopentadienyl sodium (3 mol equivalents) with anhydrous chromium trichloride (1 mol equivalent) in tetrahydrofuran at about 0° C. under a nitrogen atmosphere. When this reaction is complete the solvent is evaporated off and the residue is sublimed at about 70°–120° C. at a pressure of about 0.5 mm. Hg. The sunlimed crystals of dicyclopentadienyl chromium[II] have a melting point of 168°–170° C. (literature melting point=173° C.). Dicyclopentadienyl chromium[II], which has the empirical formula $(C_5H_5)_2Cr$, is a reddish-purple compound having a crystalline form. It is easily oxidized and very sensitive to air.

The chromocene compounds which may be used as the organometallic component of the polymerization catalysts in accordance with the present invention may be prepared as disclosed in Brantley; U.S. Pat. No. 2,870,183; issued Jan. 20, 1959 and Morehouse; U.S. Pat. No. 3,071,605; issued Jan. 1, 1963, both of which are incorporated herein by reference.

The foregoing organochromium compounds are liquids or solids soluble in many organic solvents, and the reaction between organochromium compound and zeolite is preferably carried out in the presence of a solvent. Preferred solvents are non-polar liquids at ambient temperatures which are sufficiently volatile to allow removal of solvent by evaporation. Examples of suitable solvents include alkanes, cyclo-alkanes, aromatic hydrocarbons, halogenated hydrocarbons, ethers and the like. Exemplary solvent compounds include pentane, n-hexane, decane, cyclohexane, methylcyclohexane, benzene, xylens, chloroform, diethyl ether, etc., and mixtures of one or more of the these compounds. A sufficient quantity of a solution of the chromium compound is used to completely wet the zeolite and fill the porous structure thereof to insure even distribution of the chromium compound on the zeolite. Generally, the solutions contain from about 0.002 to about 25 weight percent of the organochromium compound.

A sufficient volume of the solution of the organochromium compound is taken so as to provide from about 0.01 to 10, preferably from 0.01 to 10, most preferably from 0.25 to 1 parts by weight of the organochromium compound per 100 parts by weight of the crystalline zeolits. The contact between the zeolite and metal solution is effected in a conventional way such as by slurrying and at any convenient temperature. Generally, ambient temperature is used, although temperatures ranging from about −80° C. to as high as about 100° C. can be employed during the contacting period. Contact times of from about 0.1 to 10 hours are adequate. The resulting catalyst can be recovered and dried, for instance, by heating under a nitrogen atmosphere. Alternatively, polymerization reactions can be conducted in this same solvent based reaction medium used to form the catalyst.

The zeolite based organochromium catalysts prepared in accordance with the present invention can be used to catalyze polymerization of 1-olefins. The polymers produced using the catalysts of this invention are normally solid polymers of at least one mono-1-olefin containing from 2 to 8 carbon atoms per molecule. The catalysts of the invention are particularly useful for the preparation of high melt flow ethylene polymers. These preferred polymers are normally solid homopolymers of ethylene or copolymers of ethylene with another mono-1-olefin containing 3 to 8 carbon atoms per molecule. Exemplary copolymers include those of ethylene/propylene, ethylene/1-butene, ethylene/1-hexene, and ethylene/1-octene and the like. The major portion of such copolymers is derived from ethylene and generally consists of about 80–99, preferably 95–99 mole percent of ethylene. These polymers are well suited for extrusion, blow molding, injection molding and the like.

The polymerization reaction can be conducted by contacting monomer or monomers, e.g., ethylene, alone or with one or more other olefins, and in the substantial absence of catalyst poisons such as moisture and air, with a catalytic amount of the suported pi-bonded organo chromium[II] catalyst at a temperature and at a pressure sufficient to initiate the polymerization reaction. If desired, an inert organic solvent may be used as a diluent and to facilitate materials handling if the polymerization reaction is conducted with the reactants in the liquid phase, e.g. in a particle form (slurry) or solution process. The reaction may also be conducted with reactants in the vapor phase, e.g,, in a fluidized bed arrangement in the absence of a solvent but, if desired, in the presence of an inert gas such as nitrogen.

The polymerization reaction is carried out at temperatures of from about 30° C. or less, up to about 200° C. or more, depending to a great extent on the operating pressure, the pressure of the olefin monomers, and the particular catalyst being used and its concentration. Naturally, the selected operating temperature is also dependent upon the desired polymer melt index since temperature is definitely a factor in adjusting the molecular weight of the polymer. Preferably, the temperature used is from about 30° C. to about 100° C. in a conventional slurry or "particle forming" process or from 100° C. to 150° C. in a "solution forming" process. A temperature of from about 70° to 110° C. can be employed for fluid bed reactions.

The pressure to be used in the polymerization reactions can be any pressure sufficient to initiate the polymerization of the monomer(s) to high molecular weight polymer. The pressure, therefore, can range from subatmospheric pressures, using an inert gas as diluent, to superatmospheric pressures of up to about 30,000 psig or more. The preferred pressure is from atmospheric (0 psig) up to about 1000 psig. As a general rule, a pressure of 20 to 800 psig is most preferred.

The selection of an inert organic solvent medium to be employed in the solution or slurry process embodiments of this invention is not too critical, but the solvent should be inert to the supported pi-bonded organo chromium[II] catalyst and olefin polymer produced, and be stable at the reaction temperature used. It is not necessary, however, that the inert organic solvent medium also serve as a solvent for the polymer to be produced. Among the inert organic solvents applicable for such purposes may be mentioned saturated aliphatic hydrocarbons having from about 3 to 12 carbon atoms per molecule such as hexane, heptane, pentane, isooctane, purified kerosene and the like, saturated cycloaliphatic hydrocarbons having from about 5 to 12 carbon atoms per molecule such as cyclohexane, cyclopentane, dimethylcyclopentane and methylcyclohexane and the like and aromatic hydrocarbons having from about 6 to 12 carbon atoms per molecule such as benzene, toluene, xylene, and the like. Particularly preferred solvent media are cyclohexane, pentane, hexane and heptane.

Hydrogen can be introduced into the polymerization reaction zone in order to decrease the molecular weight of the polymers produced with the catalyst of this invention if desired (i.e., give a much higher Melt Index, MI), the catalyst of this invention being particularly sensitive to the beneficial effects of introducing hydrogen to control molecular weight. Partial pressure of hydrogen when hydrogen is used can be within the range of 5 to 100 psig, preferably 25 to 75 psig. The melt indices of the polymers produced in accordance with the instant invention can range from about 0.1 to about 70 or even higher.

More detailed description of suitable polymerization conditions including examples of particle form, solution and fluidized bed polymerization arrangements are found in Karapinka; U.S. Pat. No. 3,709,853; issued Jan. 9, 1973 and Karol et al; U.S. Pat. No. 4,086,408; issued Apr. 25, 1978. Both of these patents are incorporated herein by reference.

The effectiveness of the novel polymerization catalysts of the present invention is quite surprising in view of the relatively small external surface area of the zeolite material in comparison with the external surface area of amorphous silica materials which have conventionally been employed as supports for olefin polymerization catalysts. Also it might be expected that, with a zeolite catalyst support, rapid plugging of the zeolite interior pores would occur during the polymerization reaction. Finally, the hydroxyl content of the zeolite is relatively low, and it is the hydroxyl groups which are believed to provide the site of reaction with organochromium functional groups. Notwithstanding such potential problems which might be expedted to arise from the use of zeolite based polymerization catalysts, the zeolite-supported organochromium catalysts of the present invention are in fact surprisingly effective catalysts for the polymerization of 1-olefins.

The following examples illustrate such polymerization effectiveness but are not limiting of the invention herein.

EXAMPLE I

A sample of HZSM-5 zeolite material (crystal size 0.05 microns, silica/alumina ratio=70), was calcined overnight in a dry nitrogen stream at 500°–540° C. A sample of the calcined solid (0.8 g.) was suspended in dry heptane and a solution of dicyclopentadienyl-chromium II (chromocene) in toluene (0.16 ml. of 9 percent chromocene solution) was added thereto. The mixture was stirred for 1 hour at room temperature. The resulting solution was colorless, and the HZSM-5/chromocene reaction product was reddish brown in color. No cyclopentadiene was detected in the solution above the HZSM-5.

This mixture was heated to 50° C., and ethylene (purified through a 25 percent solution of triethylaluminum at room temperature) was bubbled into the stirred mixture for 1 hour. During this time about 2.7 grams of polyethylene were formed.

EXAMPLE II

For comparison purposes, a catalyst preparation reaction and an ethylene polymerization reaction similar to those of Example I were carried out using an amorphous silica material as the chromocene support in place of the HZSM-5 zeolite. The silica used as the support material was a high surface area, amorphous silica (surface area=300 m²/g.; pore volume of 1.65 cm³ per gram) marketed under the tradename Davison 952 by the Davison Division of W. R. Grace and Co.

This silica material was calcined at 540° C. for 16 hours. A 0.8 g. sample of this calcined material was suspended in dry heptane, and a solution of dicyclopentadienyl-chromium II (chromocene) in toluene (0.16 ml. of 9 percent chromocene solution) was added thereto. The mixture was stirred for 1 hour at room temperature thereby forming a black solid chromocene/silica reaction product.

As in Example I, the mixture was heated to 50° C. and ethylene (purified through a solution of triethylaluminum at room temperature) was bubbled into the stirred mixture for 1 hour. During this time, about 0.8 gram of polyethylene was formed.

EXAMPLES III–XII

Several additional polymerization screening runs were conducted in the same manner as described in Examples I and II. Polymerization catalysts, conditions and results are set forth in Table I.

TABLE I

Modified Catalysts for Ethylene Polymerization Activity

| Example No. | Catalyst Description | Total Solids | Polymer grams | Heptane Soluble |
|---|---|---|---|---|
| III | Davison 952, 0.2 g + Chromocene (0.16 ml of 9 percent soln) | 1.81 | 1.6 | 0 |
| IV | Davison 952, 0.8 g + Chromocene (0.16 ml of 9 percent soln) | 1.56 | 0.76 | 1.2 mg |
| V | Davison 952, 0.8 g + Chromocene (0.16 ml of 9 percent soln) | 1.78 | 0.98 | — |
| VI | HZSM-5, 0.8 g + Chromocene (0.16 ml of 9 percent soln) | 3.46 | 2.67 | 0 |
| VII | Davison 952,.0.8 g + Chromocene (0.16 ml of 9 percent soln) | 1.94 | 1.14 | 5.7 mg |
| VIII | Davison 952, 0.8 g + Chromocene (0.16 ml of 9 percent soln) | 1.96 | 1.15 | 0.5 mg |
| IX | HZSM-5, 0.8 g + Chromocene (0.16 ml of 9 percent soln) | 3.34 | 2.54 | 0 |
| X | HZSM-5, 0.8 g + Chromocene (0.16 ml of 9 percent soln) | 3.47 | 2.67 | — |
| XI | HZSM-11, 0.8 g + Chromocene (0.16 ml of 9 percent soln) | 3.61 | 2.81 | 0 |
| XII | HZSM-12, 0.8 g + Chromocene (0.16 ml of 9 percent soln) | 2.36 | 1.56 | — |

The Table I data indicate that the chromocene/HZSM-5 reaction product is, in general, a more effective ethylene polymerization catalyst under the conditions tested than is an analogous catalyst employing amorphous silica as the catalyst support.

EXAMPLE XIII

Differences in the reaction of chromocene with (a) HZSM-5 and (b) amorphous silica (Davidson 952) were demonstrated by the following procedure. Samples of chromocene (as a 9 percent solution in toluene) were added to a stirred mixture containing either the silica or the zeolite in heptane at room temperature. In the case of Davison 952, as much as 150 mg of chromocene/g of silica reacts rapidly with formation of a black solid and complete decolorization of the heptane solution. In the case of HZSM-5, much less of the chromocene reacts with the zeolite. As much as 37 mg of chromocene would completely react with the zeolite with complete decolorization of the heptane solution and formation of a red-brown catalyst complex with the HZSM-5. However, when the ratio of chromocene to HZSM-5 was increased to 75 mg/g or higher amounts of chromocene, the heptane solution was only partially decolorized even on reacting overnight. The very marked difference in the colors of the reaction products of chromocene with Davison 952 as compared to HZSM-5 suggests that different reactions are occurring with the two catalyst support materials.

What is claimed is:

1. A process for polymerizing 1-olefins, which process comprises contacting 1-olefin monomer with a catalytically effective amount of a catalyst composition comprising the reaction product of a pi-bonded organochromium [II] compound and a crystalline aluminosilicate zeolite having a silica to alumina molar ratio of at least about 12 and a Constraint Index in the approximate range of about 1 to 12, under polymerization conditions which include a temperature and pressure suitable for initiating and promoting the polymerization reaction.

2. A process according to claim 1 wherein said catalyst composition reaction product is formed in a reaction medium comprising a solvent maintained at a temperature from about −80° C. to 100° C. for a period for about 0.1 to 10 hours.

3. A process according to claim 2 wherein said reaction medium is also the medium which polymerization occurs and wherein said reaction medium solvent is selected from alkanes, cycloalkanes, aromatic hydrocarbons, halogenated hydrocarbons and ethers.

4. A process according to claim 3 wherein said reaction medium contains 0.1 to 10 parts by weight of said organochromium compound per 100 parts by weight of said zeolite.

5. A process according to claim 4 wherein said organochromium compound is selected from fused ring bis-(idenyl)-and bis(fluorenyl)-chromium [II] compounds and chromocene compounds.

6. A process according to claim 5 wherein said zeolite is selected from ZSM-5, ZSM-11, ZSM-12, ZSM-23, ZSM-35, ZSM-38 and ZSM-48.

7. A process according to claim 6 wherein said organochromium compound is di(cyclopentadienyl) chromium.

8. A process according to claim 7 wherein said zeolite is ZSM-5.

9. A process according to claim 1 or 6 wherein said catalyst composition further comprises a catalyst binder.

10. A process according to claim 9 wherein said olefin monomer is ethylene.

11. A process according to claim 9 wherein said polymerization reaction conditions include a temperature from about 30° C. to 200° C. and a pressure from about 0 to 1000 psig.

12. A process according to claim 11 wherein the polymerization reaction is conducted with reactants in the liquid phase and in the presence of an inert organic solvent.

13. A process according to claim 11 whaerein the polymerization reaction is conducted with the reactants in the vapor phase.

14. A process according to claim 13 wherein the vapor phase polymerization reaction is conducted with the catalyst in a fluidized bed.

* * * * *